United States Patent Office 2,721,221
Patented Oct. 18, 1955

2,721,221

PROPANOL EXTRACTION OF SODIUM VANILLINATE

Collis C. Bryan, Seattle, Wash., assignor to Monsanto Chemical Company, St. Louis, Mo., a corporation of Delaware No Drawing. Application May 12, 1952,
Serial No. 287,413

9 Claims. (Cl. 260—600)

This invention relates to an improved process for the extraction of sodium vanillinate from aqueous alkaline liquors such as the reaction mixtures obtained by the controlled oxidation of lignin materials in an aqueous medium containing high concentrations of sodium hydroxide. More specifically, this invention relates to novel extraction systems wherein such liquors containing sodium vanillinate are extracted with an aqueous solution of a propanol as the preferential solvent for the sodium vanillinate.

In the presence of an alkali such as sodium hydroxide, 4-hydroxy-3-methoxybenzaldehyde, more commonly known as vanillin, forms a sodium salt through the 4-hydroxy group and it is this sodium salt that is herein referred to by the phrase "sodium vanillinate."

It is an object of this invention to provide extraction systems for the extraction of sodium vanillinate from such alkaline oxidized lignin liquors with a propanol, which systems are characterized by rapid and clean phase separations and minimized emulsion problems. The preferred processes of this invention permit the rapid extraction of over 99% of the sodium vanillinate to recover the sodium vanillinate with a minimum content of impurities, and therefore, the recovered sodium vanillinate can be easily converted to vanillin by known methods at low cost and with minimum handling losses.

In general, the treatment of lignin to obtain vanillin has involved the cooking of a lignin-rich material such as waste sulfite liquor in an autoclave in contact with oxygen and with a high concentration of caustic soda under oxidizing conditions of pressure such as 50 to 200 pounds per square inch and at moderately high temperatures of the order of 160–200° C., followed by the recovery and further purification of the crude sodium vanillinate to obtain pure vanillin as the final product.

The crude liquor originally obtained by such treatment of lignin material is, of course, strongly alkaline and the vanillin obtained is present as sodium vanillinate. Due to the drastic treatment of the lignin starting material with the combination of a high concentration of alkali and high temperature in the presence of oxygen, the liquor also contains a troublesome content of miscellaneous degradation products of a tar-like character which materials seriously interfere with purification.

From time to time, various methods have been proposed for the extraction and conversion of the crude sodium vanillinate to vanillin. An early method was to first acidify the entire batch of autoclaved liquor to initially convert the sodium vanillinate to vanillin and then extract the vanillin with a suitable selective solvent, such as benzene, toluene, ether, or the like. This method, however, was found to be handicapped by inherent high cost due to the large acid requirements for neutralization of the large excess of alkali in the autoclaved mixture of reaction products. It was recognized that, if the sodium vanillinate as such could be removed from the liquor, then the major portion of acid now wasted in neutralizing the miscellaneous, non-vanillin constituents could be saved. It was also found that, under proper conditions, certain alcohols would selectively extract the sodium vanillinate from the autoclaved liquors. As an illustration of the use of an alcohol to selectively extract the sodium vanillinate, reference is made to U. S. Patent 2,104,701—Sandborn, which utilizes preferably water immiscible normal butanol as the extracting agent and recovers the vanillin salt in solution in the substantially water-immiscible alcohol. This process attained the advantage of eliminating most of the waste of acid for neutralizing non-vanillin materials.

It is also known that an alcohol extraction process is possible using a propanol such as iso-propanol or n-propanol as the extracting agent, although the propanols are alcohols which are infinitely miscible with water, due to the fact that the large amounts of dissolved solids in the highly concentrated autoclaved liquors "salt out" the propanol and the propanol therefore acts as a liquor-immiscible alcohol.

It has now been discovered that when an extraction system is formed by the admixture of a propanol with the aqueous alkaline sodium vanillinate-containing liquors obtained from the oxidizing autoclave treatment of lignin raw materials, such liquors being herein called "autoclaved liquors," there is a critical range of solids content for the raffinate which permits extremely rapid and clean separation of the system into a propanol solvent phase (herein termed "extract") and a residual aqueous liquor phase (herein termed "raffinate").

The term "solids content" as used herein describing and claiming the process of this invention is meant to include the undissolved and dissolved normally solid materials contained in the autoclaved liquors or raffinate, and is reported as a percentage of the total weight of the liquor. For example, an autoclaved liquor having a "solids content" of 35% would mean that, upon evaporating 100 pounds of this autoclaved liquor to dryness, there would remain 35 pounds of solid materials as a residue. Generally, 95% or more of the solids content of the autoclaved liquors are dissolved materials in solution in the liquors. Usually less than 5% of the solids content of the liquors are undissolved materials and therefore filtrable to remove them from the autoclaved liquors. Either filtered or unfiltered autoclaved liquors may be utilized in the extraction processes of this invention. The breaking of emulsions in the extraction system and phase separation of the extraction system is somewhat more rapid when filtered autoclaved liquors are used, but the phase separation, when unfiltered liquor is used, is sufficiently rapid to cause no difficulty when the other teachings of this invention are adhered to.

In the extraction of sodium vanillinate from autoclaved liquors with an aqueous solution of a propanol, it has been the practice of the art to first concentrate the autoclaved liquors to as high a solids content as practicable, because as the solids content of the liquors was increased, the solubility of the propanol in the liquor phase was decreased. That is, the higher the solids content of the liquor, the more pronounced was the "salting out" effect on the propanol. Thus the practice of the art was to concentrate the autoclaved liquors to 40–50% solids content and then extract the sodium vanillinate from the concentrated liquors by the addition of a water-propanol azeotrope, agitation and then permitting the system to separate into two immiscible phases, namely an aqueous liquor phase (raffinate) and a propanol solvent phase (extract). While substantial quantities of sodium vanillinate could be extracted from the autoclaved liquors by such a system, these systems were not commercially feasible because during the agitation of the water-propanol azeotrope with the concentrated autoclaved liquors, very stable emulsions were formed which required exceedingly long settling times to "break" and form the raffinate and extract phases. Moreover, even after long settling periods, the phase separations were not clean because of emulsions remaining at the phase interfaces. For example, when one volume of an autoclaved liquor concentrated to 45.5% solids content was mixed in an extraction system with 1.5 volumes of the water-iso-propanol azeotrope (88% iso-propanol), a settling time of 24 hours was required for the separation of a raffinate and an extract phase. Such an operation is obviously unsuitable for use in a commercial process.

When the concentrated liquors are extracted with azeotropic propanol solutions, there is a transference of water from the liquor phase to the propanol phase thereby effectively further increasing the concentration of the dissolved and undissolved solids in the liquor phase. The solids content of the raffinate after phase separation, therefore, is actually increased over the solids content of the original concentrated liquor entering the extraction system. In the case of the foregoing example wherein concentrated liquor having a solids content of 45.5% was extracted with the iso-propanol azeotrope, the solids content of the raffinate after phase separation was increased to in excess of 50% due to the transference of the water from the liquor phase to the propanol phase.

The extraction process of the present invention facilitates efficient extraction and recovery of sodium vanillinate from autoclaved lignin liquors and is characterized by rapid and clean raffinate and extract phase separations, the phase separations being complete within a 1.5 hour settling period, and generally within a 5 to 15 minute settling period when the preferred conditions are adhered to, as contrasted to the 24 hour settling periods required in the practice of the prior art. The process of this invention is based upon the novel combination of two critical condtions for the extraction system, the first being that the propanol must constitute at least 30% by weight of the entire extraction system, that is, 30% of the total of the weight of the raffinate and extract. While the quantity of the propanol used in the extraction system may be varied so that the propanol constitutes from at least 30 to about 50% of the entire extraction system, it is preferred that the propanol constitute about 35 to 40% of the entire system.

The second critical condition of this invention is that the solids content of the raffinate after phase separation must be maintained within the range of 20 to 40%, however, the limits of 25 to 37% for the solids content of the raffinate further define a critical range from the standpoint of preferred operation.

The following table illustrates the critical nature of the solids content of the raffinate with respect to the time required for the extraction systems to "break" and separate into a raffinate and an extract phase. Iso-propanol constituted between about 35 to 45% of the total of the weights of the raffinate and extract in each case:

| Solids Content of Raffinate | Approximate Time for Phase Separation |
| --- | --- |
| Below 20% | No phase separation. |
| 25 to 37% | 5 to 45 minutes. |
| 40% | 1.5 hours. |
| 45% | 5 hours. |
| 50% | 24 hours. |

The solids content of the raffinate of the extraction system is determined principally by the total quantities and proportions of "solids," propanol and water present in the extraction system. Therefore, the solids content of the raffinate after phase separation is determined by three variables, namely, (1) The solids content of concentrated autoclaved liquor entering the system.
(2) The dilution of the aqueous propanol solution entering the system to supply the propanol solvent content.
(3) The total propanol content of the extraction system.

Therefore, the solids content of the raffinate can be varied and controlled at the will of the operator by increasing or decreasing the solids content of the autoclaved liquors, by increasing or decreasing the propanol content of aqueous propanol solution entering the system, and by varying the ratio of the volumes of liquor and propanol solution entering the system.

To illustrate the improvement in the rate of phase separation as provided by the practice of this invention, reference is again made to the example of the practice of the prior art as hereinabove set out. When the concentrated autoclaved liquor having a 45.5% solids content was extracted with 1.5 volumes of 70% iso-propanol, rather than the 88% azeotropic iso-propanol, the solids content of the resulting raffinate was about 40% and the time required for phase separation was reduced to about 1.5 hours as contrasted to the 24 hour period required when 88% iso-propanol was added to the extraction system. If the autoclaved liquors having a 45.5% solids content were extracted with a still more dilute iso-propanol solution, namely 1.5 volumes of 60% iso-propanol, the solids content of the resulting raffinate would be reduced to within the preferred range of 25 to 37% and accordingly the phase separations would be complete in less than 30 minutes. Thus, it is shown how the solids content of the raffinate can be adjusted and controlled to within the critical limits of this invention by the addition of a highly diluted propanol to the highly concentrated autoclaved liquors. The same adjustment could be made by the addition of water to the original extraction system wherein the concentrated liquors were mixed with azeotropic iso-propanol. On the other hand, where the solids content of the autoclaved liquors are relatively low, a more concentrated iso-propanol solution can be used to bring the solids content of the raffinate within the required range.

Thus, it is readily apparent that the operator has a selection of variables within his control with which adjustments can be made to bring the solids content of the raffinate within the critical ranges as described for this invention.

In the extraction of sodium vanillinate from autoclaved liquors from about 0.7 to about 2 volumes of aqueous propanol solution may be passed into the extraction system for each volume of concentrated liquor entering the system. A ratio of about 1.5 volumes of the propanol solution for each volume of concentrated autoclaved liquor generally will provide a good extraction system.

As an aid to the practice of this invention, the following table sets forth the approximate limits on the solids content of the autoclaved liquor so that when such liquor is added to and mixed with 1.5 volumes of an aqueous propanol solution of the indicated concentration, that the phase separations can be attained in the indicated time. In the groups of extraction systems wherein the phase separation took place in 45 minutes or less, the solids content of the raffinate is within the preferred range of about 25 to 37%. In the group of extraction systems wherein the time required for phase separation is 1 to 1.5 hours, the solids content of the raffinate was between about 37 and 40%, which is approaching the extreme critical limits for this invention. In the groups of extraction systems wherein the time required for phase separa- tion is 5 to 24 hours, the solids content of the raffinate exceeds 40% and is thus beyond the critical limits as defined for this invention.

| Solids Content of Autoclave Liquor, Percent | Concentration of Isopropanol Solution Entering System, Percent | Approximate Time for Phase Separation |
|---|---|---|
| 20–26 | 88 | } 15 min. or less. |
| 22–29 | 80 | |
| 25–33 | 70 | |
| 26–30 | 88 | } 15 to 45 min. |
| 30–34 | 80 | |
| 33–41 | 70 | |
| 30–36 | 88 | } 1 to 1.5 hours. |
| 34–40 | 80 | |
| 41–47 | 70 | |
| 36–42 | 88 | } 5 hours. |
| 40–46 | 80 | |
| 47–50 | 70 | |
| 46 | 88 | } 24 hours. |
| 50 | 80 | |
| 60 | 70 | |

The preferred method of operation is to adjust the solids content of the autoclaved liquor and the dilution and proportion of the propanol solution entering the extraction system so that the solids content of the incoming liquor approximates the required solids content of the raffinate for rapid phase separation. If these conditions are observed, the transference of water between the raffinate and extract phases is minimized and phase separation takes place very rapidly. Further reason for adjusting the solids content of the autoclaved liquor prior to extraction is that this procedure automatically greatly reduces the burden of unwanted alkaline impurities which will be taken up by the propanol phase and thus, at the same time, further reduces the consumption of acid required eventually to neutralize all of the alkaline constituents when subsequently converting the propanol extracted sodium vanillinate to vanillin.

The following example illustrates the practice of this invention with respect to a single stage extraction system. 247.1 g. of concentrated autoclaved liquor having a solids content of 30.3% was mixed with about 1.8 volumes of 80% iso-propanol, the iso-propanol thereby constituting about 45% of the entire mixture, and then stirred for 10 minutes. After the stirring was stopped, the mixture was permitted to stand for a 5 minute settling period during which time the emulsion broke forming clean immiscible raffinate and extract layers. The raffinate had a solids content of 29.6% and the extract contained 78% of the sodium vanillinate originally contained in the autoclaved liquor.

As a single stage extraction system permits the recovery of only about 75% of the sodium vanillinate present in the liquor phase, a system having a series of extraction stages is required to recover a larger proportion, such as 97 to 99% of the sodium vanillinate originally present in the autoclaved liquors. Extraction systems having multiple extraction stages may be a counterflow batch system of two or more successive batch stages, or a countercurrent continuous system which has the effect of having two or more extraction stages.

Where the propanol extraction is carried out in a countercurrent continuous system or a counterflow batch system conducted in two or more successive stages, the critical features of this invention apply to each stage. That is, in each stage, the propanol should constitute at least 30% of the total of the weight of the raffinate and extract in each particular stage, and in each stage the solids content of the raffinate should be maintained within the range of 20 to 40%, and preferably 25 to 37%. In carrying out a countercurrent extraction system of two or more successive stages, and in accordance with this invention, a preferred method of operation is to adjust the concentration and proportion of aqueous propanol solution entering the first stage so that the solids content of the raffinate within this first stage is within the preferred range of 25 to 37%, because then the optimum solids content of the raffinate is automatically maintained in all of the other stages and thus each extraction stage can be carried out at a maximum speed width separation into extraction and raffinate phases in about 5 to 15 minutes. By such a process, if the system contains at least three stages, it is possible to recover in the extract phase from the first stage over 97% of the available sodium vanillinate originally present in the autoclaved liquor. Furthermore, crude sodium vanillinate recovered by this process is low in impurities so that it is readily converted to U. S. P. vanillin by known methods and with minimum handling losses.

As compared to the use of butanol, it has been found that, under the conditions of the process of the present invention, there are two outstanding advantages from using propanol.

(1) Butanol, ordinarily described as a water-immiscible alcohol, is of course, inherently very low in solvent power for alkaline water present in this process. Since propanol is miscible with water in all proportions, it is comparatively very much higher in solvent power for aqueous alkaline solutions. The sodium vanillinate is a water-soluble salt of vanillin. Consequently, a propanol, with only moderate dilution with water, is able to pick up a much greater proportion of the sodium vanillinate in any given extraction than that which could be extracted by butanol.

(2) In the use of a propanol in the process of this invention, as contrasted to the methods of the prior art, a propanol may be used as the extraction solvent for the sodium vanillinate with a high efficiency of extraction, making possible the recovery of 99% of the sodium vanillinate present in the crude reaction mixtures and also provides a process wherein the phase separation of the propanol layer and the alkaline liquor layer takes place readily and thereby provides a rapid method of extraction of the sodium vanillinate with a relatively inexpensive propanol. Moreover, the recovered sodium vanillinate has a very low content of alkaline impurities and other impurities extracted from the alkaline liquor. In contrast to this, when a propanol was used in accordance with the methods of the prior art, the phase separation was very slow and the recovery of the sodium vanillinate was reduced.

The following example further illustrates the operation of the process of this invention, but this invention is not limited merely to the details of these examples, for it is readily apparent that there are numerous other variations of procedure possible by those skilled in the art within the spirit and scope of the invention as described herein.

A solution of crude sodium vanillinate comprising the reaction mixture from an autoclaved alkaline oxidation of waste sulfite liquor solids was concentrated to about 30% solids content and the sodium vanillinate was extracted in the following manner, using iso-propanol as the preferential extraction solvent for the sodium vanillinate.

A supply of iso-propanol was diluted with water to about a 78% alcohol content. The crude sodium vanillinate solution from the autoclave which had been concentrated to about a 30% solids content was then extracted in a countercurrent, five-stage batchwise system. The autoclaved liquor was introduced into the first stage and progressed successively through stages 2, 3, 4 and 5. The aqueous iso-propanol solution was first introduced to the fifth stage. After agitation and separation of the two phases, namely, the raffinate phase and the extract phase, the extract phase was transferred successively to the fourth, third, second and first stages. Each stage was agitated moderately and separation occurred in the respective stages within the time range of five to fifteen minutes of standing. The raffinate was removed from the fifth stage and had a solids content within the preferred range of 25 to 37%, and the iso-propanol or extract phase was removed from the system from the first stage. The temperature of the solutions during the five stages was maintained between about 50° C. and 70° C., which has been found to provide maximum speed of separation. The extract or iso-propanol phase which was removed from the fifth stage was found to contain 99.2% of the sodium vanillinate originally present in the crude alkaline liquors which were introduced in the first stage.

A countercurrent continuous process with the same starting material, namely, the crude alkaline liquor mixture containing the sodium vanillinate which has been concentrated to 30% solids was equally effective. In the practice of the process of this invention, either a single continuous extraction column may be used or a series of connected mixers and settlers is equally effective.

In regard to the agitation, it has been found that this should be kept down to the minimum necessary to obtain good mixing, since excessive agitation tends to form emulsions which seriously retard the separation of the propanol and alkaline liquor phases.

As illustrative of a continuous countercurrent extraction process embodying the features of this invention, the autoclaved liquor is concentrated to about 35% solids content and the sodium vanillinate may be extracted continuously in the following manner, using normal propanol as the preferential extraction solvent for the sodium vanillinate. The extraction system may be a series of five connected settling tanks with intermediate mixers. The rate of flow and size of the settling tanks are so designed so as to give an effective sojourn time of 15 minutes in each settling tank, which permits complete and continuous phase separation of the propanol and raffinate phases. In operation, the autoclaved liquor to be extracted is continuously supplied to a mixer together with the propanol layer from the second settling tank, the mixer discharging to the first settling tank. The propanol layer is continuously removed from the first settling tank and contains 99.1% of the sodium vanillinate originally present in the autoclave liquors. The raffinate from the first settling tank is continuously removed and mixed with the propanol layer from the third settling tank, the mixer continously discharging into the second settling tank. The raffinate from the second settling tank is continuously removed and mixed with the propanol layer from the fourth settling tank, the mixer discharging into the third settling tank. In like manner, the raffinate from the third settling tank is continuously removed and mixed with the propanol layer from the fifth settling tank, the mixer discharging into the fourth settling tank. The raffinate from the fourth settling tank is continuously removed and mixed with a sufficient amount of fresh aqueous 75% n-propanol solution so that the propanol constitues about 35% of the raffinate and extract in each stage, this mixer discharging to the fifth settling tank from which the completely extracted liquors are continuously removed. The solids content of the raffinate from each stage remained within the range of 25 to 37%.

It is seen that normal propanol is about equally effective as iso-propanol in the extraction process of this invention and may be used in the same critical range with respect to the solids content of the raffinate and concentration of the propanol.

The above examples have illustrated the extraction process of this invention wherein the extractions were performed in countercurrent extraction systems of five successive stages. While systems having five successive stages are preferred because over 99% of the sodium vanillinate can be consistently recovered in five stages, substantially 99% of the sodium vanillinate may generally be recovered in four stages. However, it is recommended that at least three stages be employed to secure a consistent recovery of at least 97% of the sodium vanillinate. While successive batchwise stages and continuous flow systems utilizing settling tanks as effective extraction stages have been shown, a single extraction column may be used. In the use of a single extraction column, it is preferred that a column be used of such a height and flow rate so as to be the equivalent of a five stage countercurrent extraction system to insure consistent recovery of over 99% of the sodium vanillinate, however a single extraction column of a height and flow rate equivalent to a three stage countercurrent system may be used if a 97% sodium vanillinate recovery is deemed satisfactory.

Whether a continuous extraction system or a system using a series of batchwise stages is employed, it has been found that the use of agitation should be kept down to the minimum necessary to obtain good mixing, since excessive agitation tends to form emulsions which seriously retard the phase separation. Under normal operation without excessive agitation, the phase separation between the two layers is generally sharply defined within a period of five to fifteen minutes. However, it will be understood by those skilled in the art that the time required for the complete phase separation will vary with the ratio of the batch size to the area of the interface and the separation under some conditions may require a period of time somewhat longer than fifteen minutes. In batchwise operation, a complete phase separation at the interface is required and, therefore, under some conditions, a period of time somewhat in excess of fifteen minutes may be required to complete this phase separation, particularly if an emulsion has formed at the interface. In a continuous operation, of course, complete phase separation at the interface is not required and an adequate separation of the two phases is normally reached in a very short length of time. However, even in those instances where the time required for the phase separation may be somewhat in excess of fifteen minutes, say even thirty minutes, this added amount of time is in reality negligible when compared to the twenty-four hour separation periods which were required by the extraction processes of the prior art.

This application is a continuation-in-part of my co-pending application Serial No. 66,830, filed December 22, 1948, now abandoned.

What is claimed is:

1. In a process wherein sodium vanillinate is extracted from an aqueous liquor with a propanol as the liquor immiscible preferential solvent for the sodium vanillinate, the step comprising mixing the aqueous liquor with an aqueous propanol solution in proportions to form a two-phase extraction system wherein the raffinate phase has a solids content within the range of 20 to 40% and wherein propanol is present in the extraction system in an amount equal to at least 30% of the combined weight of the extract and raffinate phases.

2. A process of claim 1 wherein the aqueous propanol solution is an aqueous solution of iso-propanol.

3. In a process wherein sodium vanillinate is extracted from an aqueous liquor with a propanol as the liquor immiscible preferential solvent for the sodium vanillinate, the step comprising mixing the aqueous liquor with an aqueous propanol solution in proportions to form a two-phase extraction system wherein the raffinate phase has a solids content within the range of 25 to 37% and wherein propanol is present in the extraction system in an amount equal to at least 30% of the combined weight of the extract and raffinate phases.

4. A process of claim 3 wherein the aqueous propanol solution is an aqueous solution of iso-propanol.

5. In a process for recovering sodium vanillinate from aqueous alkaline reaction mixtures comprising the autoclaved liquors obtained by the partial oxidation of waste sulfite liquors in the presence of sodium hydroxide, and wherein the sodium vanillinate is extracted from said autoclaved liquors with a propanol as the preferential liquor immiscible solvent for the sodium vanillinate, the steps comprising mixing the autoclaved liquor with a propanol and adjusting the total water content of the mixture so that a two-phase extraction system is formed wherein the raffinate phase has a solids content within the range of 20 to 40% and wherein propanol is present in the extraction system in an amount equal to at least 30% of the combined weight of the extract and raffinate phases.

6. A process of claim 5 wherein the propanol is iso-propanol.

7. In a process for recovering sodium vanillinate from aqueous alkaline reaction mixtures comprising the autoclaved liquors obtained by the partial oxidation of waste sulfite liquors in the presence of sodium hydroxide, and wherein the sodium vanillinate is extracted from said autoclaved liquors with a propanol as the preferential liquor immiscible solvent for the sodium vanillinate, the steps comprising mixing the autoclaved liquor with an aqueous propanol solution of such a concentration that a two-phase extraction system will form having a raffinate phase with a solids content within the range of 25 to 37% and wherein propanol is present in the extraction system in an amount equal to at least 30% of the combined weight of the extract and raffinate phases.

8. In a process for recovering sodium vanillinate from aqueous alkaline reaction mixtures comprising the autoclaved liquors obtained by the partial oxidation of waste sulfite liquors in the presence of sodium hydroxide, and wherein the sodium vanillinate is extracted from said autoclaved liquors with a propanol as the preferential liquor immiscible solvent for the sodium vanillinate, the steps comprising adjusting the solids content of said liquors to within the range of 25 to 37%, passing said liquors of 25 to 37% solids content through a countercurrent extraction system of at least three successive stages wherein said liquors are caused to enter said countercurrent extraction system at a first stage and pass successively through the succeeding stages to a final stage, introducing an aqueous propanol solution containing 70 to 80% of a propanol into said final stage and causing said propanol solution to pass successively through the preceding stages to said first stage countercurrently to the passage of said liquors through said stages and contacting said liquors in each stage with said propanol solution, said liquors becoming relatively leaner in sodium vanillinate content at each stage until said liquor is removed from the countercurrent extraction system at said final stage, said propanol solution becoming relatively richer in sodium vanillinate content at each stage until said propanol solution is removed from said extraction system at said first stage, wherein the solids content of the raffinate in each stage remains within the limits of 25 to 37% by weight, the amount of propanol present in each stage being equal to at least 30% of the combined weight of the extract and raffinate phases of said stage, and over 97% of the sodium vanillinate is recovered in solution in the propanol extract from the final stage.

9. The process of claim 8 wherein the countercurrent extraction system contains five successive stages, wherein each stage is maintained within the temperature range of about 50° C. to 70° C., and wherein the propanol is iso-propanol.

References Cited in the file of this patent

UNITED STATES PATENTS

| | | |
|---|---|---|
| 2,399,607 | Servis | Apr. 30, 1946 |
| 2,489,200 | Sankey et al. | Nov. 22, 1949 |